United States Patent [19]

Shafer

[11] Patent Number: 4,770,477
[45] Date of Patent: Sep. 13, 1988

[54] LENS USABLE IN THE ULTRAVIOLET

[75] Inventor: David R. Shafer, Fairfield, Conn.

[73] Assignee: The Perkin-Elmer Corporation, Norwalk, Conn.

[21] Appl. No.: 938,091

[22] Filed: Dec. 4, 1986

[51] Int. Cl.$^4$ .......................... G02B 13/14; G02B 9/60
[52] U.S. Cl. ...................................... 350/1.2; 350/463; 350/465
[58] Field of Search ................. 350/1.1, 1.2, 463, 471, 350/465

[56] References Cited

FOREIGN PATENT DOCUMENTS 0871122 10/1981 U.S.S.R. ............................... 350/1.2

Primary Examiner—Bruce Y. Arnold
Assistant Examiner—Jay Ryan
Attorney, Agent, or Firm—Thomas P. Murphy; Edwin T. Grimes; Francis L. Masselle

[57] ABSTRACT

There is disclosed a high performance lens usable in the ultraviolet region of the spectrum. It is a lens of triplet form modified by the addition of double-Gaussshells with a strong field flattening lens near the fast end.

4 Claims, 2 Drawing Sheets

LENS USABLE IN THE ULTRAVIOLET

TECHNICAL FIELD

This invention relates to the field of optical lens design.

BACKGROUND

In recent years the evolution of lens designs for microlithography has extended into the ultraviolet spectral region. This causes three distinct problems for the designer. First is that very few glasses transmit well at, for example, the mercury I line ($\lambda=0.3650$ micron). Absorption of light by a complicated multi-element lens can cause substantial thermal problems and result in poor optical performance due to thermal gradients and shifting focus. High transmission can only be achieved by using a few specific glass types known to have good transmission in the ultraviolet.

In particular, the positive crown glass lenses, which account for most of the light path, must have low indices of refraction in order to get good transmission. This, in turn, is bad for performance since low index lenses need steeper curves (and hence have worse aberrations) than high index lenses. Conventional designs often depend on the use of high index glass as a means of achieving good performance and they are difficult to convert into low index versions. Extra lenses may be required to regain the high index performance level. The first problem then, when operating in the ultraviolet, is that of getting good performance using only low index glasses.

The second problem is related. Many designs make use of index differences between lenses as a tool for controlling monochromatic aberrations. The high transmission constraint may not only force the usable glass types down into the low index range, it may also greatly restrict—or even remove—the index differences available to the designer. In the extreme case, where the wavelength is so short that only fused silica (quartz) and fluorite transmit well, there is only one index difference available and it is too small to be of much use. The problem then is to have a design with high performance but which makes essentially no use of index difference as a design variable.

The third problem relates to color correction. The dispersion of glasses in the ultraviolet is very high. This makes the change in aberrations with wavelength larger and larger as one goes further into the ultraviolet. Performance change within the spectral bandwidth of the mercury I line, for example, may be significant. Correction of a distant wavelength used for alignment or testing, such as one in the visible region, is especially difficult if astigmatism has to be controlled. Good correction at two very widely separated wavelengths is quite difficult.

DISCLOSURE OF INVENTION

The present invention comprises a lens of triplet form modified by the addition of double-Gauss shells with a strong field flattening lens near the fast end.

BEST MODE FOR CARRYING OUT THE INVENTION

Figure 1:
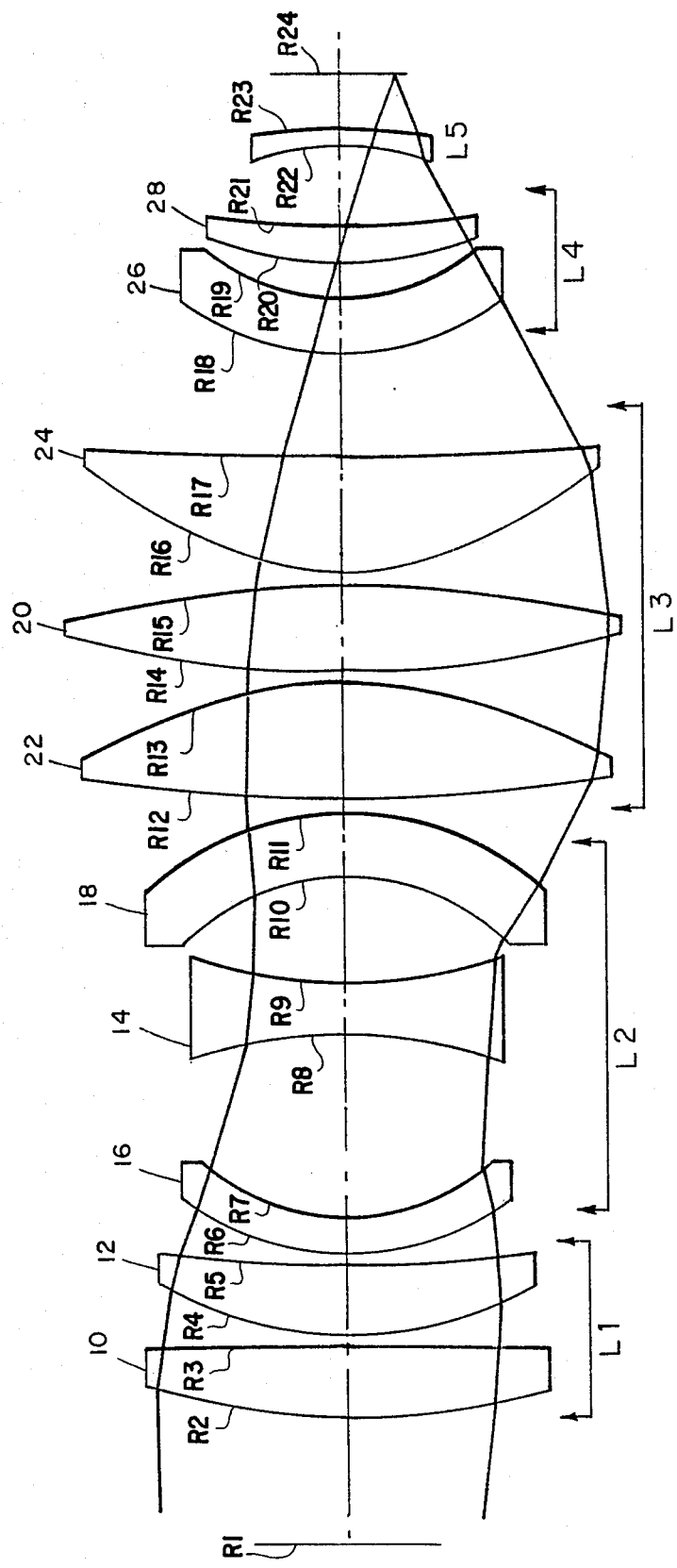
FIG. 1 is a diagram of a lens according to the invention.

With particular reference to FIG. 1, there is illustrated a high performance design with only one glass type—namely, fused silica. It has extremely high transmission deep into the ultraviolet and has excellent performance despite the very low index of refraction of the glass. It is a monochromatic design with no color correction. It comprises five lens groups. A first lens group $L_1$ is composed of a pair of positive lenses 10, 12. The second group $L_2$ is formed from a central negative lens 14 surrounded by negative shells 16, 18. An important feature of this invention is that most of the negative power of the triplet $L_2$ is in the central lens 14 and much less is in the shells 16, 18. Next is a second positive lens group $L_3$ comprising a central bi-convex lens 20 between a pair of substantially plano-convex lenses 22, 24. The fourth group $L_4$ is a negative group comprising a meniscus lens 26 in the form of a negative shell and a positive lens 28. The order of this pair of lenses may be reversed while still obtaining good results. The final lens $L_5$ comprises a strong negative field flattener. A specific example of the lens described above is set forth below

EXAMPLE 1

| Mercury H-line Design —No Color Correction 5× Magnification .35 numerical aperture 24 mm field diameter | | | |
|---|---|---|---|
| Surface | Radius | Thickness | Glass |
| R1 (object) | Inf. | 25.5265 | Air |
| R2 | +14.9177 | .6000 | Fused Silica |
| R3 | −21.0167 | .0000 | Air |
| R4 | +6.1551 | .6000 | Fused Silica |
| R5 | +36.6461 | .0000 | Air |
| R6 | +3.2959 | 1.7840 | Fused Silica |
| R7 | +1.8393 | .7000 | Air |
| R8 | −5.1782 | .3000 | Fused Silica |
| R9 | +10.3227 | 1.4186 | Air |
| R10 | −2.1647 | .2421 | Fused Silica |
| R11 | −3.0232 | .1000 | Air |
| R12 | +25.3863 | 1.2500 | Fused Silica |
| R13 | −4.6365 | .0000 | Air |
| R14 | +18.5135 | 2.0000 | Fused Silica |
| R15 | −12.0471 | .1000 | Air |
| R16 | +4.8336 | 1.2500 | Fused Silica |
| R17 | −14.0858 | .0500 | Air |
| R18 | +3.9800 | .6500 | Fused Silica |
| R19 | +11.2254 | .9239 | Air |
| R20 | +1.8494 | .2500 | Fused Silica |
| R21 | +1.4190 | .9050 | Air |
| R22 | −2.2148 | .1500 | Fused Silica |
| R23 | −4.6045 | .6000 | Air |
| R24 Image | Inf. | | |
| With telecentric exit pupil. | | | |

The design described above has extremely high transmission deep into the ultraviolet and has very good performance despite the very low index of refraction of the glass. It is a monochromatic design with no color correction. It bears a superficial resemblance to the middle section of a double-Gauss lens which has had a negative lens inserted between the meniscus shells. The behavior, however, is quite different. This is primarily due to the triplet $L_2$ wherein most of the negative power is centered in the center lens 14 rather than the shells 16, 18. This is just the reverse of the modified double-Gauss. As a result, the two designs have significantly different correction for oblique spherical aberration and different achromatization properties as well.

The design of FIG. 1 has performance which is limited by higher order image curvature. However, this can be corrected by a modification of the field flattener $L_5$ that is described in U.S. patent application Ser. No. 927,215 of Irwin Friedman, filed concurrently herewith and assigned to a common assignee.

Figure 2:
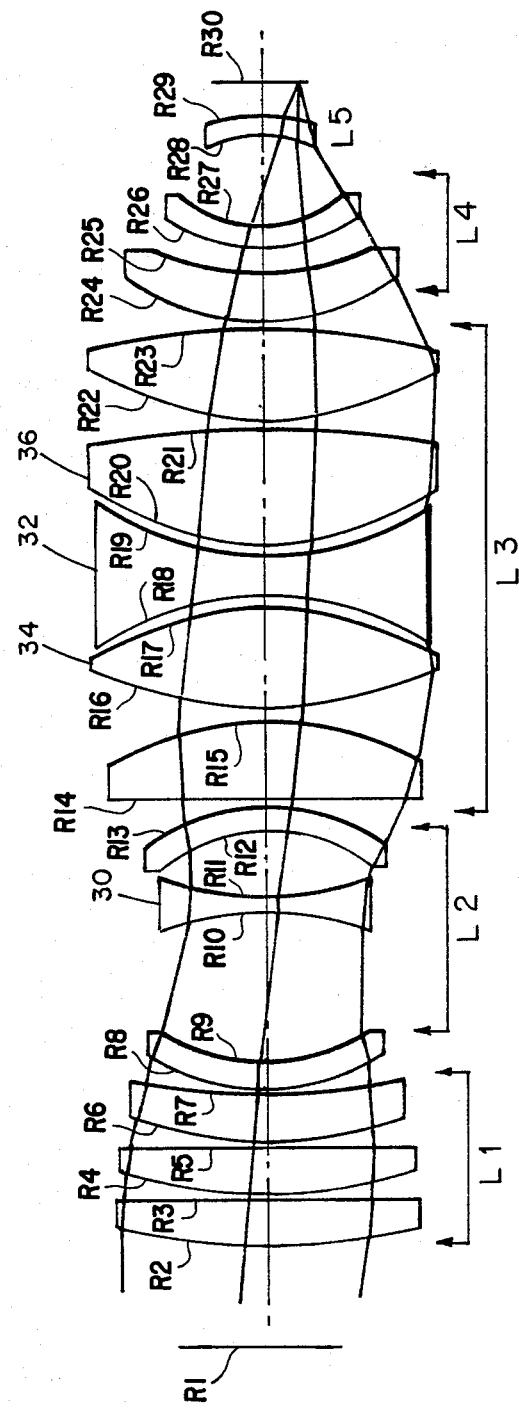
FIG. 2 is a modified form of the lens of FIG. 1.

The lens illustrated in FIG. 1 may be corrected for color by the addition of a second glass type as illustrated in FIG. 2. The central negative lens 14 of group $L_2$ is replaced by a flint glass lens 30. This partially achromatizes the lens. The bulk of the color correction, however, is achieved by replacing the positive lens 20 of group $L_3$ in FIG. 1 with a three lens unit comprising a negative flint lens 32 surrounded by two positive lenses 34, 36. This group is not cemented, although it could be. By contrast, most double-Gauss modifications with high performance have a strong Tessar type cemented surface in them that cannot be de-cemented without total internal reflection. An additional change, which is simply a design variation, is the change of the first positive lens group $L_1$ from a two lens to a three lens design.

The lens illustrated in FIG. 2 is corrected for both longitudinal and lateral color. Furthermore, it is also corrected for chromatic variation of third order spherical aberration, coma, astigmatism, and distortion. Thus, the lens is corrected for the chromatic variation of all these aberrations, including the very difficult chromatic variation of astigmatism—all by adding just one lens 32. A specific example of the design of FIG. 2 is given below.

EXAMPLE 2

| Surface | Mercury H-line lens 5X Magnification .35 numerical aperture 24 mm field diameter | | |
|---|---|---|---|
| | Radius | Thickness | Glass Type |
| R1 Object | Inf. | 23.8623 | Fused Silica |
| R2 | −93.6920 | 0.6000 | Fused Silica |
| R3 | −11.8924 | 0.0000 | Fused Silica |
| R4 | 11.6888 | 0.6000 | Fused Silica |
| R5 | −49.3766 | 0.1000 | Fused Silica |
| R6 | 4.8182 | 0.7000 | Fused Silica |
| R7 | 13.0117 | 0.1248 | Fused Silica |
| R8 | 2.5921 | 0.8431 | Fused Silica |
| R9 | 1.8867 | 0.7359 | Fused Silica |
| R10 | −7.0521 | 0.3000 | Schott LF-5 |
| R11 | 3.5779 | 1.9313 | Schott LF-5 |
| R12 | −2.1454 | 0.3000 | Fused Silica |
| R13 | −2.5594 | 0.1000 | Fused Silica |

-continued

| Surface | Mercury H-line lens 5X Magnification .35 numerical aperture 24 mm field diameter | | |
|---|---|---|---|
| | Radius | Thickness | Glass Type |
| R14 | 24.2529 | 1.2500 | Fused Silica |
| R15 | −4.5103 | 0.1000 | Fused Silica |
| R16 | 6.8587 | 1.6000 | Fused Silica |
| R17 | −5.1613 | 0.0702 | Fused Silica |
| R18 | −5.0744 | 0.2000 | Schott LF-5 |
| R19 | 4.2236 | 0.1000 | Schott LF-5 |
| R20 | 4.5246 | 1.4000 | Fused Silica |
| R21 | −7.4133 | 0.1000 | Fused Silica |
| R22 | 3.8538 | 1.2500 | Fused Silica |
| R23 | −13.7868 | 0.1888 | Fused Silica |
| R24 | 3.1836 | 0.5272 | Fused Silica |
| R25 | 4.3618 | 0.4122 | Fused Silica |
| R26 | 2.3161 | 0.2500 | Fused Silica |
| R27 | 1.6635 | 1.2041 | Fused Silica |
| R28 | −2.2779 | 0.1500 | Schott LF-5 |
| R29 | −4.6373 | 0.6005 | Schott LF-5 |
| R30 | Inf. | 0.0000 | |
| Image (Telecentric) | | | |

In the foregoing example the chromatic variations are exactly zero in the vicinity of the mercury H line. Choice of a particular distant wavelength in the visible for alignment or test would then require that these chromatic variations depart slightly from zero to balance higher-order variations at that distant wavelength.

It will be apparent to those skilled in the art that a number of variations and modifications may be made in this invention without departing from its spirit and scope. Accordingly, the foregoing description is to be construed as illustrative only, rather than limiting. This invention is limited only by the scope of the following claims.

I claim:

1. A high performance lens usable in the ultraviolet region of the spectrum which comprises, from the long conjugate side to the short conjugate side:
   a first positive lens group;
   a triplet including a first negative meniscus shell, a central negative lens, and a second negative meniscus shell;
   a second positive lens group;
   a negative lens group;
   a negative field flattener; and
   wherein the power of the central negative lens of the triplet is substantially greater than that of either of said first and second shells.

2. The lens of claim 1 wherein all the elements have substantially the same index of refraction.

3. The lens of claim 1 wherein both of said second positive lens group and said triplet contain negative color-correcting lenses.

4. The lens of claim 3 wherein the color correcting elements are flint glass and the other elements are fused silica.

* * * * *